United States Patent [19]

Melamed et al.

[11] Patent Number: 5,784,596
[45] Date of Patent: Jul. 21, 1998

[54] ALGORITHMIC MODELING OF TES PROCESSES FOR SIMULATION ANALYSIS

[75] Inventors: Benjamin Melamed, Warren, N.J.; Predrag Jelenkovic, New York, N.Y.

[73] Assignee: NEC USA, Inc., Princeton, N.J.

[21] Appl. No.: 931,062

[22] Filed: Sep. 15, 1997

Related U.S. Application Data

[63] Continuation of Ser. No. 554,251, Nov. 8, 1995, abandoned, and Ser. No. 311,303, Sep. 23, 1994, abandoned.

[51] Int. Cl.⁶ .................................................. G05B 13/04
[52] U.S. Cl. ........................... 395/500; 364/149; 364/194
[58] Field of Search ........................... 395/500; 364/149, 364/194

[56] References Cited

U.S. PATENT DOCUMENTS

| | | | |
|---|---|---|---|
| 4,680,784 | 7/1987 | Lehnert et al. | 379/11 |
| 5,088,058 | 2/1992 | Salsburg | 364/500 |
| 5,214,746 | 5/1993 | Fogel et al. | 395/23 |
| 5,257,364 | 10/1993 | Melamed et al. | 395/500 |

OTHER PUBLICATIONS

Jelenkovic and Melamed; Algorithmic Modeling of TES Processes; IEEE Transactions on Automatic Control, vol. 40, No. 7; pp. 1305–1312, Jul. 1995.

Jagerman et al.; Bidirectional Estimation and Confidence Regions for TES Processes; 1995; pp. 94–98 MASCOTS '95: Modeling, Analysis, and Simulation Int'l. Workshop.

Daniel Geist et al, "TEStool: An Environment for Visual Interactive Modeling of Autocorrelated Traffic" in proceedings of the 1992 International Conference on Communications, vol. 3, pp. 1285 to 1289, 1992.

B. Melamed, "An Overview of TES Processes and Modeling Methodology" in Performance Evaluation of Computer and Communication Systems (L. Donatiello and R. Nelson, Eds.) pp. 359 to 393. Springer–Verlag Lecture Notes in Computer Sciences 1993.

D. J. Jagerman et al, "The Transition and Autocorrelation Structure of TES Processes Part II: Special Cases", in Stochastic Models, vol. 8(3), pp. 499 to 527, 1992.

D. L. Jagerman et al, "The Transition and Autocorrelation structure of TES Processes Part I; General Theory", in Stochastic Models vol. 8 (2) pp. 193 to 219 1992.

*Primary Examiner*—William M. Treat
*Assistant Examiner*—Kenneth R. Coulter
*Attorney, Agent, or Firm*—Philip J. Feig

[57] ABSTRACT

TES (Transform-Expand-Sample) is a versatile class of stationary stochastic processes which can model arbitrary marginals, a wide variety of autocorrelation functions, and a broad range of sample path behaviors. An algorithmic method replaces the previously relied upon heuristic search, thereby automating TES modeling for simulation analysis. The algorithm is solved in a nonlinear programming setting, which takes advantage of fast and accurate computation of TES autocorrelation functions and their partial derivatives to implement a steepest-descent technique, preferably based on Zoutendijk's Feasible Direction Method. The method has particular application to data compression and specifically compressed video.

8 Claims, 5 Drawing Sheets

Input: $K, y = (P, \ldots, P_{K-1}, \xi) \in H_{K-1}, \nabla h_{K-1}(y)$
Output: $d = (d_1, \ldots, d_{K-1}, d_K)$ for $1 \leq j \leq K$ do
    set $d_j = -sign(\partial h_{K-1}(y)/\partial y_j)$ if $\xi = 0$ and $\partial h_{K-1}(y)/\partial \xi > 0$ then $d_K = 0$
elseif $\xi = 1$ and $\partial h_{K-1}(y)/\partial \xi < 0$ then $d_K = 0$ for $1 \leq n \leq K-1$ do
    begin
        if $P_n = 0$ and $\partial h_{K-1}(y)/\partial P_n > 0$ then $d_n = 0$
        if $P_n = 1$ and $\partial h_{K-1}(y)/\partial P_n > 0$ then $d_n = 0$
    end while $\sum_{n=1}^{K-1} P_n = 1$ and $\sum_{j=1}^{K-1} dj > 0$
    begin
        $n = \mathrm{argmin}\{-\partial h_{K-1}(y)/\partial P_j : j \in I_{K-1}(d)\}$
        if $P_n = 0$ or ($d_n = 0$ and $P_n = 1$)
        then
            if $P_n = 0$ then $d_n = 0$ else $d_n = -1$
        else
            if $\sum_{j=1}^{K-1} d_j > 1$ then $d_n = -1$ else $d_n = 0$
    end

FIG. 1

ALGORITHMIC MODELING OF TES PROCESSES FOR SIMULATION ANALYSIS

This is a continuation of application Ser. No. 08/554,251 filed Nov. 8, 1995, now abandoned, and a continuation of application Ser. No. 08/311,303 filed Sep. 23, 1994, now abandoned.

FIELD OF THE INVENTION

The present invention relates to an algorithmic methodology for automating Transform-Expand-Sample (TES) modeling and specifically for use as an input analysis method for simulation analysis in general and in broadband video traffic modeling, in particular.

BACKGROUND OF THE INVENTION

Stochastic dependence is quite common in real-world random phenomena, including bursty traffic in high-speed communications networks. Compressed video, also known as VBR (variable bit rate) video, is a case in point. Intuitively, burstiness is present in a traffic process, if arrival points appear to form visual clusters on the time line. The mathematical underpinning of burstiness is complex; two main factors contributing to traffic burstiness are the marginal distribution and autocorrelation function of traffic interarrival times or of the magnitudes of arriving workloads. Strong positive short-term autocorrelations are good indicators of traffic burstiness. Analytical models, however, tend to ignore dependence in order to gain analytical tractability; in particular, the bulk of queuing models is devoted to the study of queues with independent interarrival and service times. The impact of autocorrelation in traffic processes on queueing measures (e.g., mean queue length, mean waiting times and loss probabilities in finite buffers) can be very dramatic, even in light traffic regimes; worse still, ignoring correlations leads to over-optimistic predictions which are often off by orders of magnitude.

Modeling temporal dependence in time-series often involves a trade-off between model accuracy and computational feasibility. The histogram construct, which models first-order properties, is one example of this trade-off. The autocorrelation function, which models second-order properties, is another. The latter is a popular statistical proxy of dependence, especially in engineering disciplines. A natural idea is to capture first-order and second-order properties of empirical time series (assumed to be from a stationary probability law) by fitting simultaneously both the empirical distribution (histogram) and empirical autocorrelation function.

Transform-Expand-Sample (TES) is a versatile class of stationary stochastic processes with general marginals, a wide variety of autocorrelation functions (e.g., monotone, oscillatory and others), and broad range of sample path behaviors (e.g., directional and reversible). From a Monte Carlo simulation prospective, TES generation algorithms are fast and require little memory. In essence, TES is a first-order nonlinear autoregressive scheme with modulo-1 reduction and additional transformations. Its specification comprises two kinds of parameters from two distinct sets. The first set, which is algorithmically determined, guarantees an exact match to the empirical distribution (histogram). The second set largely determines the autocorrelation structure. In order to approximate the empirical autocorrelation function, the TES modeling methodology to-date employs a heuristic search approach on a large parametric space.

Effective TES modeling requires software support. An interactive visual modeling environment, called TEStool, was designed and implemented to support heuristic searches for TES models under human control. TEStool is described in an article by D. Geist and B. Melamed entitled "TEStool: An Environment for Visual Interactive Modeling of Autocorrelated Traffic" in Proceedings of the 1992 International Conference on Communications, Vol. 3, pp. 1285 to 1289, 1992. TEStool allows the user to read in empirical time series and calculate their statistics (histogram, autocorrelation function and spectral density) in textual and graphical representations. It provides services to construct and modify TES models and to superimpose the corresponding TES statistics on their empirical counterparts. The search proceeds in an interactive style, guided by visual feedback: each model modification triggers a recalculation and redisplay of the corresponding statistics. This approach has several limitations. First, effective TES modeling requires qualitative understanding of TES processes as well as experience; second, the search scope and speed are fundamentally limited by the speed of the human response bounded by the individual limits of human patience; and third, modeling precision is constrained by screen resolution as perceived by the human eye. A TES modeling algorithm is described and illustrated in U.S. Pat. No. 5,257,364 issued to B. Melamed and D. Jagerman and entitled "Method for Generating a Correlated Sequence of Variates with Desired Marginal Distribution for Testing a Model of a Communication System", which is hereby incorporated herein by reference.

SUMMARY OF THE INVENTION

The present invention provides an algorithmic methodology for automating TES modeling, thereby shifting the modeling burden from a human conducting a heuristic search over a large parametric space. The modeling problem is solved in a nonlinear programming environment, taking advantage of fast and accurate computation of TES autocorrelation functions and their partial derivatives to implement a steepest-descent technique based on Zoutendijk's Feasible Direction Method. Among the different techniques which can be used to practice the invention, for example, gradient projection, penalty method or the like, Zoutendijk's Feasible Direction Method was found to be the best. This method depends heavily on an efficient "linear" search for the optimal feasible direction which constitutes a solution to a linear programming subproblem. An explicit solution is possible, owing to the relatively simple constraints involved. In addition, the apparent smooth local behavior of the objective function contributes significantly to the overall good performance of the modeling algorithm.

The TES modeling algorithm has been incorporated into the TEStool modeling environment to supplement its heuristic search support, largely automating the search. The user is only asked to specify a few discretization parameters which determine the accuracy and the computational complexity of the search. The end-product of the algorithm are multiple candidate TES models whose number is a user-supplied parameter. The final selection of a model is made by the user, by inspecting the associated simulated sample paths and judging their "resemblance" to their empirical counterpart. TEStool permits the display of intermediate results, mainly as a didactic means of elucidating TES modeling and the intuition behind it.

This last step is not automated, since in the absence of an agreed upon mathematical measure, sample path "resemblance" is necessarily subjective. However, users are routinely called upon to make such subjective judgments. The present modeling approach centers on the so-called GSLO (Global Search Local Optimization) algorithm which combines a global search with a local nonlinear programming to minimize an objective function comprising the distance between the empirical autocorrelation function and its candidate model counterpart. The notion of distance is taken as a weighted sum of squared differences between autocorrelations of corresponding lags. Key to this approach is the existence of fast and numerically stable analytical formulas for calculating the objective function and its partial derivatives, as well as the simplicity of the constraints in the ensuing nonlinear optimization problem. The method is described in conjunction with three examples: two from the domain of compressed video traffic, and one representing results from a physics laboratory experiment on laser intensity.

Experimentation with the modeling algorithm, as implemented in TEStool, has yielded remarkably accurate TES models of empirical records in a relatively short period of time, typically on the order of minutes. Experience with a variety of empirical data sets confirms that the algorithmic TES modeling methodology can serve as a powerful input analysis technique for simulation analysis in general, and broadband video traffic modeling, in particular.

The invention will more clearly be understood when the following description is read in conjunction with the accompanying drawing.

BRIEF DESCRIPTION OF THE DRAWING

FIG. 1 is pseudo-code for the Optimal Feasible Direction Subproblem;

DETAILED DESCRIPTION OF THE INVENTION

Figure 2:
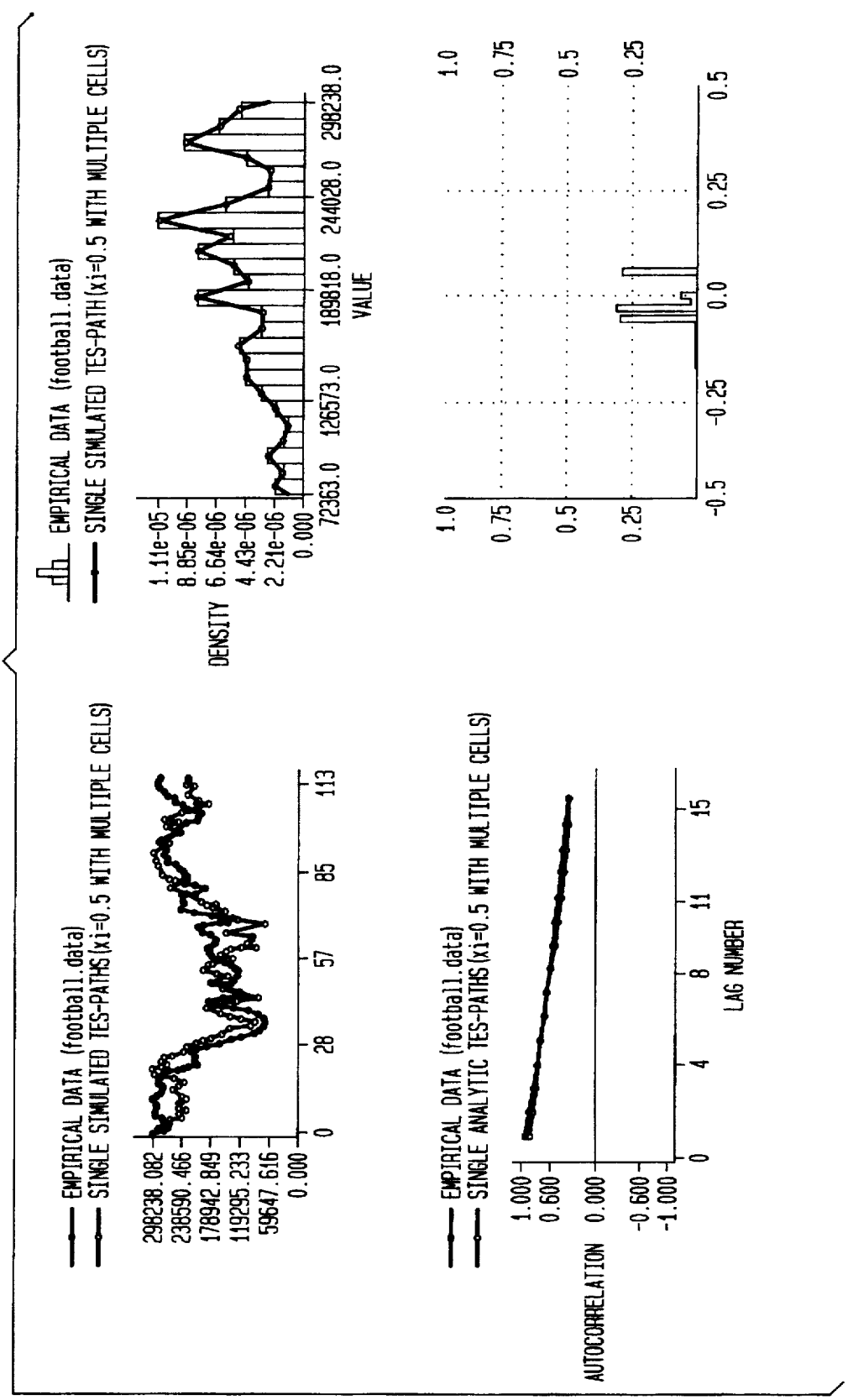
FIG. 2 shows a TEStool screen showing the results for algorithmic TES modeling of a empirical sample path of VBR video.

In order to better understand the present invention, a brief background regarding TES processes is provided. A more detailed overview is found in an article by B. Melamed entitled "An Overview of TES Processes and Modeling Methodology" in Performance Evaluation of Computer and Communication Systems (L. Donatiello and R. Nelson, Eds.) pp 359 to 393, Springer-Verlag Lecture Notes in Computer Sciences 1993.

In the following description $f$ will denote the Laplace transform of a function, $\tilde{f}$, and $1_A$ will denote the indicator function of set A.

The construction of a TES process involves two random sequences in lockstep. The first sequence, called a background TES process, plays an auxiliary role. It is chosen as either $\{U_n^+\}_{n=0}^\infty$ or $\{U_n^-\}_{n=0}^\infty$, defined recursively by $$U_n^+ = \begin{cases} U_0, & n=0 \\ \langle U_{n-1}^+ + V_n \rangle, & n>0 \end{cases} \quad U_n^- = \begin{cases} U_n^+, & n \text{ even} \\ 1-U_n^+, & n \text{ odd} \end{cases} \quad (1)$$

The value of, $U_0$ is distributed uniformly on (0,1); $V=\{V_n\}_{n=1}^\infty$ is a sequence of iid random variables, independent of $U_0$, called the innovation sequence; and angular brackets denote the modulo-1 (fractional part) operator $\langle\chi\rangle = \chi - \max\{\text{integer n}: n \leq \chi\}$. The superscript notation in equation (1) is motivated by the fact that $U^+ = \{U_n^+\}$ and $U^- = \{U_n^-\}$ can generate lag-1 autocorrelations in the ranges [0,1] and [-1,0], respectively. There will always be appended plus or minus superscripts to other mathematical objects associated with $\{U_n^+\}$ and $\{U_n^-\}$, but the superscript is omitted when the distinction is immaterial. Intuitively, the modulo-1 arithmetic used in the definition of the background TES processes in equation (1) gives rise to a simple geometric interpretation as random walks on a circle of circumference 1 (unit circle), with mean step size $E[V_n]$.

The second sequence, called a foreground sequence, is the target TES model. Foreground TES sequences are denoted $\{X_n^+\}_{n=0}^\infty$ or $\{X_n^-\}_{n=0}^\infty$, respectively, and given by $$X_n^+ = D(U_n^+), \quad X_n^- = D(U_n^-), \quad (2)$$

where D is a real-valued measurable transformation from [0,1), called a distortion. Equation (2) defines two classes of TES models, denoted $TES^+$ and $TES^-$, respectively.

The autocorrelation functions of TES processes, with common variance, $0 < \sigma_X^2 < \infty$, can be calculated numerically from fast and accurate formulas. Specifically, for any $\tau \geq 0$, the corresponding autocorrelations of lag $\tau$ for $\{X_n^+\}$ and $\{X_n^-\}$, respectively, are given by $$\rho_X^+(\tau) = \sum_{v=1}^\infty Re[\tilde{f}_V^\tau(i2\pi v)] w_v^+, \quad \rho_X^-(\tau) = \quad (3)$$

$$\begin{cases} \sum_{v=1}^\infty Re[\tilde{f}_V^\tau(i2\pi v)] w_v^+, & \tau \text{ even} \\ \sum_{v=1}^\infty Re[\tilde{f}_V^\tau(i2\pi v)] w_v^-, & \tau \text{ odd} \end{cases}$$

where $$w_v^+ = \frac{2|\tilde{D}(i2\pi v)|^2}{\sigma_X^2}, \quad w_v^- = \frac{2Re[\tilde{D}^2(i2\pi v)]}{\sigma_X^2}. \quad (4)$$

Analytical formulas for $\tilde{f}_V(i2\pi v)$ and $\tilde{D}(i2\pi v)$ are given in an article by D. J. Jagerman and B. Melamed entitled "The Transition and Autocorrelation Structure of TES Processes Part II" "Special Cases", in Stochastic Models, Vol. 8(3), pp 499 to 527, 1992.

Given an empirical time series, $\{Y_n\}_{n=0}^N$, one uses in practice a composite distortion of the form $$D_{Y,\xi}(\chi) = \hat{H}_Y^{-1}(S_\xi(\chi)), \quad \chi \in [0,1). \quad (5)$$

Here, the inner transformation, $S_\xi$, is a "smoothing" operation, called a stitching transformation, parameterized by $0 \leq \xi \leq 1$, and given by $$S_\xi(y) = \begin{cases} y/\xi, & 0 \leq y \leq \xi \\ (1-y)/(1-\xi), & \xi \leq y < 1 \end{cases} \quad (6)$$

The outer transformation, $\hat{H}_Y^{-1}$, is the inverse of the empirical (histogram) distribution function computed from $\{Y_n\}$ as $$\hat{H}_Y^{-1}(x) = \sum_{j=1}^J 1_{[\hat{C}_{j-1}, \hat{C}_j)}(x) \left[ l_j + (x - \hat{C}_{j-1}) \frac{w_j}{\hat{p}_j} \right], \quad x \in [0,1), \quad (7)$$

where J is the number of histogram cells, $[l_j, r_j)$ is the domain of cell j with width $\omega_j = r_j - l_j > 0$, $\hat{p}_j$ is the probability estimator of cell j and $\{\hat{C}_j\}_{j=0}^J$ is the cumulative distribution function (cdf) of $\{\hat{p}_j\}_{j=1}^J$, i.e., $\hat{C}_j = \sum_{i=1}^j \hat{p}_i$, $1 \leq j \leq J$ ($\hat{C}_0 = 0$ and $\hat{C}_J = 1$).

The rationale for TES processes stems from the following facts. First, all TES background sequences are stationary Markovian, and their marginal distribution is uniform on [0,1), regardless of the probability law of the innovations $\{V_n\}$ selected, as a consequence of the General Iterated Uniformity Lemma in the article by D. L. Jagerman and B. Melamed entitled "The Transition and Autocorrelation Structure of TES Processes Part I; General Theory", in Stochastic Models Vol 8(2) pp 193 to 219 1992. Second, the inversion method described by L. Devroye in a book entitled "Non-Uniform Random Variate Generation", Springer-Verlag, 1986, permits, in principle, transforming any uniform variate to others with arbitrary distributions as follows: if U is uniform on [0,1) and F is a prescribed distribution, then $X=F^{-1}(U)$ has distribution F, the case $F=\hat{H}_Y$ being a special case. And third, for $0<\xi<1$, the effect of $S_\xi$ is to render the sample paths of background TES sequences more "continuous-looking". As stitching transformations preserve uniformity, the inversion method can still be applied to stitched background processes, $\{S_\xi(U_n)\}$, so that any foreground TES variate of the form $X_n=\hat{H}_Y^{-1}(S_\xi(U_n))$, obtained from any background sequence $\{U_n\}$, is always guaranteed to obey the empirical distribution (histogram), $\hat{H}_Y$, regardless of the innovation density $fv$ and stitching parameter $\xi$ selected, while the choice of $(fv, \xi)$ determines its dependence structure and, in particular, its autocorrelation function. Thus, TES modeling decouples the fitting of the empirical distribution from the fitting of the empirical autocorrelation function. Since the former is guaranteed, one can concentrate on the latter.

An important property of the autocorrelation functions in equation (3) is their uniform absolute summability in $\tau$, which is an easy consequence of the facts $$0 \leq \sum_{v=0}^{\infty} |w_v^-| \leq \sum_{v=0}^{\infty} w_v^+ = 1, \quad \text{and} \tag{8}$$

$$|f_V^*(i2\pi v)| \leq 1, \tau \geq 0, v \geq 1.$$

This allows the fixing of $D_{Y,\xi}$ and the use of the same finite sum in calculating autocorrelations for all lags, $\tau$, thereby achieving a uniformly bounded error. These calculations are both fast and accurate. Experimentation has shown that just seven terms in the sums of equation (3) suffice to keep the error under 0.01, uniformly in $\tau$.

Having set forth the background of TES processes, the formulation of the TES fitting problem for TES processes of specialized form will now be described. The following description will restrict the treatment to distortions, $D_{Y,\xi}$, from equation (5), which represent TES parameters of the first kind, and to pairs, $(fv, \xi)$, of step-function innovation densities and stitching parameters, which represent TES parameters of the second kind. These choices of $D_{Y,\xi}$ and $fv$ have the merit of simplicity, without loss of generality (every density can be approximated arbitrarily closely by step functions).

An exact match to the empirical histogram is guaranteed by equation (5). Thus, the problem reduces to one of approximating the empirical autocorrelation function, $\hat{\rho}_Y$, by some TES model autocorrelation function, $\rho_{fv,\xi}$, to be determined through the choice of $(fv, \xi)$. To this end, a metric on the space of autocorrelation functions is needed. This metric should reflect the fact that in most applications (e.g., queueing systems), it is more important to approximate the lower-lag auto-correlations than the higher-lag ones. This consideration leads us to employ an objective function whose general form is a weighted sum of squared differences between the empirical and modeled autocorrelations, namely, $$g(fv,\xi) = \sum_{\tau=1}^{T} \alpha_\tau [\rho_{fv,\xi}(\tau) - \hat{\rho}_Y(\tau)]^2, \tag{9}$$

where T is the maximal autocorrelation lag to be approximated, and the $0<\alpha_\tau \leq 1$ are weight coefficients. The modeling problem can now be set up in a nonlinear optimization framework, namely, a search for a pair, $(fv, \xi)$, which minimizes the autocorrelation distance in the sense of equation (9). What is sought is the solution to the following nonlinear optimization problem:

For a fixed inverse histogram distribution of equation (7), find an optimal innovation density and stitching parameter, $(f_v^*, \xi^*)$, such that $$(f^*_v, \xi^*) = \underset{(fv,\xi)}{\text{argmin}} \{g(fv,\xi)\}, \tag{10}$$

where $g(fv, \xi)$ is given in equation (9).

Next, restrict the scope of innovation densities considered. In spite of their generality and convenience, general step-function densities still constitute a very large class, and from a computational viewpoint, have the drawback that constituent functions have unbounded supports. Referring to equation (1), observe that $$U_n^+ = (U_{n-1}^+ + V_n) = (U_{n-1}^+ + (V_n)),$$

which implies that only innovation variates of the form $(V_n)$ need be considered. Consequently, it is possible to restrict consideration to step-function densities $fv$, whose support is contained in [0,1); in fact, owing to the modulo-1 arithmetic in equation (1), any support interval of length one will do. The interval [−0.5,0.5) is chosen as a convenient particular case.

Next, to render the minimization procedure tractable, further restrict admissible $f_v$ to lie in the set $Q=U_{k=1}^{\infty}Q_k$, where $Q_k$ is the set of step-function innovation densities, $f_v$, over [−0.5,0.5) of the form $$fv(x) = \sum_{n=1}^{k} P_n 1_{[-0.5+(n-1)/k, -0.5+n/k)}(x), \tag{11}$$

parameterized by the set $P_k$ of discrete densities of the form $P=(P_1, \ldots, P_k)$. In practice, approximate the set Q by a subset $Q_K$ for a large K (say, K=100), and define the parameter space $$g_K=\{(P,\xi): P \in P_K, \xi \in [0,1]\}. \tag{12}$$

The original optimization problem then reduces to, for a fixed inverse histogram distribution of equation (7) and a fixed K>0, find an optimal pair, $(P^*, \xi^*) \in g_K$, such that $$(P^*,\xi^*) = \underset{(P,\xi) \in G_K}{\text{argmin}} \{g_K(P,\xi)\}, \tag{13}$$

where $$g_K(P,\xi) = \sum_{\tau=1}^{T} \alpha_\tau [\rho_{P,\xi}(\tau) - \hat{\rho}_Y(\tau)]^2, \quad (P,\xi) \in G_K, \tag{14}$$

and T and $\alpha_\tau$ are as in equation (9).

The latter problem is a reduction of the former problem to a finite-dimensional nonlinear optimization problem with two favorable properties. First, it is subject to simple linear constraints; and second, there exist analytical formulas for the objective function and its partial derivatives with respect to every optimization variable. Consequently, the latter problem is amenable to a variety of standard nonlinear programming techniques.

The following description concerns the derivation of the partial derivatives of the objective function, $g_K$, in equation (14). To simplify the notation, write $(P_1, \ldots, P_K, \xi)$, rather than $((P_1, \ldots, P_K), \xi)$, interchangeably with $(P, \xi)$. Clearly, $g_K(P_1, \ldots, P_K, \xi)$ has partial derivatives, if $\rho_{P_1, \ldots, P_K, \xi}(\tau)$ does. A direct calculation of the Laplace transform, $\tilde{f}V$, of $fv \in Q_K$ yields (see equation (11) with k=K), $$\tilde{f}_V(i2\pi v) = \sum_{n=1}^{K} P_n \frac{e^{i\pi v(K-2n+1)/K} \sin(\pi v/K)}{\pi v/K} \quad (15)$$

Equation (8) ensures that the series in equation (3) are uniformly convergent, so that it is possible to interchange there the order of differentiation and summation, leading to $$\frac{\partial \rho_{P,\xi}^{\pm}(\tau)}{\partial P_n} = \sum_{v=1}^{\infty} \tau Re\left[ \tilde{f}_V^{-1}(i2\pi v) \frac{\partial \tilde{f}_V(i2\pi v)}{\partial P_n} \right] w_v^{\pm}, \quad (16)$$

$$\frac{\partial \rho_{P,\xi}^{\pm}(\tau)}{\partial \xi} = \sum_{v=1}^{\infty} \tilde{f}_V(i2\pi v) \frac{\partial w_v^{\pm}}{\partial \xi}. \quad (17)$$

Since from equation (15), $$\left| \frac{\partial \tilde{f}_V(i2\pi v)}{\partial P_n} \right| \leq \frac{|\sin(\pi v/K)|}{\pi v/K} < 1,$$

for all $v \geq 1$, it is concluded again with the aid of equation (8) that equation (16) is uniformly summable in $\tau$ for all $1 \leq n \leq K$ and all $(P, \xi) \in g_K$; this implies that it is possible to use the same finite sum representation for the partial derivatives in equation (16) for all $1 \leq n \leq K$, all $(P, \xi) \in g_K$, and each $\tau$, while retaining a uniformly bounded error. The situation in equation (17) is more complex due to the fact that equation (8) is no longer guaranteed to hold. For every $v \geq 1$, represent $\tilde{D}_{V,\xi}(i2\pi v) = \alpha_{\xi,v} + i b_{\xi,v}$. From Proposition 4 in Jagerman and Melamed supra it follows that $$\frac{\partial w_v^{\pm}}{\partial \xi} = \frac{2}{\sigma_X^2} \left[ \alpha_{\xi,v} \frac{\partial \alpha_{\xi,v}}{\partial \xi} \pm b_{\xi,v} \frac{\partial b_{\xi,v}}{\partial \xi} \right]. \quad (18)$$

A careful analysis of the formulas for $\alpha_{\xi,v}$, $b_{\xi,v}$ and the corresponding partial derivatives shows that $$\frac{\partial w_v^{\pm}}{\partial \xi} = O(1/v),$$

for $0 \leq \xi \leq 1$. This fact, together with the observation $|\tilde{f}_V(i2\pi v)| = O(1/v)$, allows the conclusion that the error of a finite-sum approximation of equation (17) with L summands is on the order of O(1/L).

The foregoing discussion provides the basis for a numerical procedure for fast and accurate calculation of the autocorrelation function and its partial derivatives (with respect to all optimization variables) associated with the TES processes under consideration.

Figure 5:
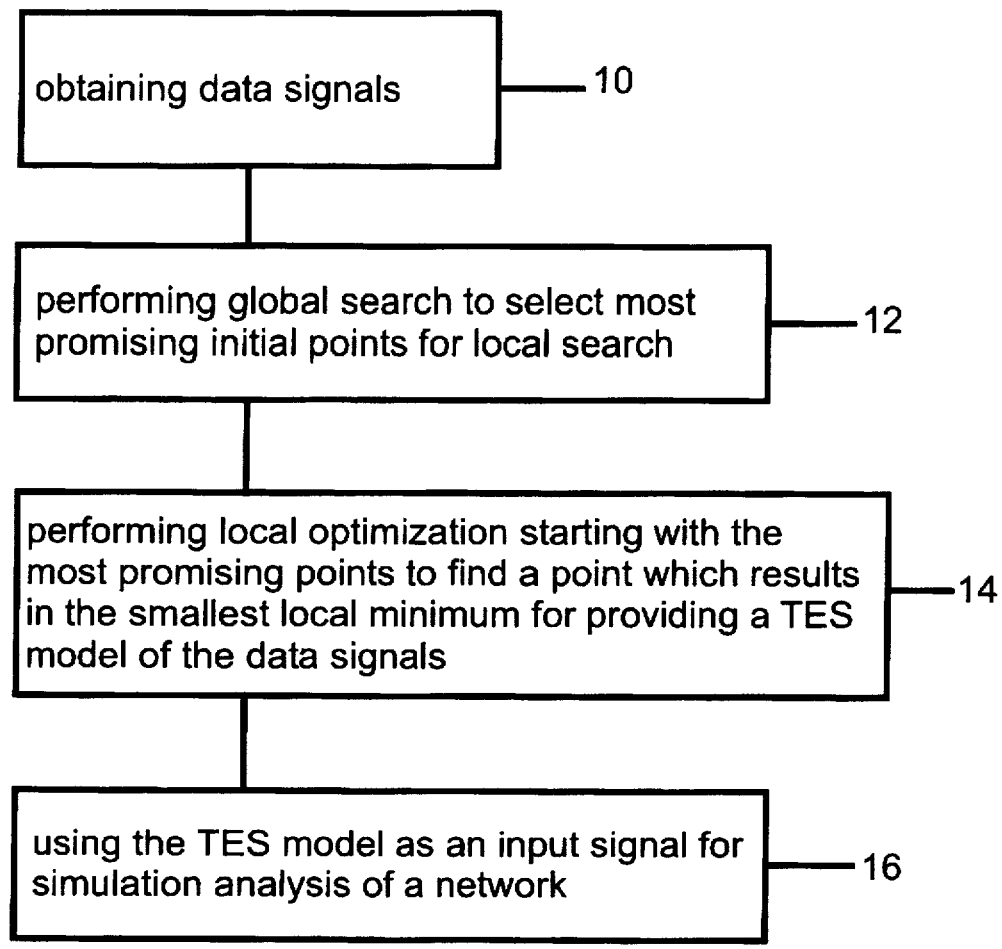
FIG. 5 is a flow diagram of a preferred method of simulation analysis in accordance with the teachings of the present invention.

The following description presents an algorithmic solution for latter problem, which is termed the GSLO (Global Search Local Optimization) algorithm. It is described below with reference to FIG. 5 for given integers, K and B. The method commences with obtaining the data signals in step 10.

For global search (GS) step 12, discretize the parameter space, $g_K$, into a finite number of points. Then, for each point, evaluate the objective function, $g_K$, in equation (14), and keep the best B points (those points, x $\in g_K$, which give rise to the B smallest values of $g_K(x)$).

For local optimization (LO) step 14, using each of these B points as a starting point, find a local minimum of $g_K$ via a nonlinear programming algorithm. Then, select among them that point, x*, which gave rise to the smallest local minimum, $g_K(x^*)$. The result (in step 16) is a TES model for simulation analysis.

Note that the global search first selects the B most promising initial points for the local search, so as to increase the chance that the best local minimum found is relatively close to the global minimum. However, the user is free to select a less optimal model, if its simulated realizations are judged to bear a "better resemblance" to the empirical record.

In addition to K and B, the global search algorithm requires the specification of two additional parameters, $N_P$ and $N_\xi$; these are the number of equidistant values that each $P_n$ and $\xi$ can assume, respectively. The total number, $N_{tot}$, of points, x, at which the GSLO Algorithm needs to evaluate $g_K(x)$ in the global search step above is $$N_{tot} = 2N_\xi \binom{N_P + K - 2}{N_P - 2}, \quad (19)$$

where the factor 2 is due to the fact that both the TES$^+$ and TES$^-$ classes of processes are searched. Clearly, the parameters $N_P$, $N_\xi$ and K must be moderate, since $N_{tot}$ grows very fast in them.

A computer implementation of the global search step is straightforward. The objective function is calculated inside K+1 nested loops (K loops for the discretization of each $P_n$, and one for that of $\xi$); the computed value is then compared with the current best set, namely, the running set of best (at most B) values in some sorting order. If the newly computed value improves on the worst value in the current best set, then the worst value is discarded and the new value is added in the sorted order. The process continues this way until the whole discretized space is searched. Finally, since the number of loops, K+1, is a parameter of the algorithm, loop traversal was implemented by recursive calls.

The local optimization in the local optimization step above is implemented, using the nonlinear programming method, called Zoutendijk Feasible Direction Method. This method is an iterative procedure where at each iteration one determines (i) the optimal feasible direction for the choice of the next point, and (ii) the optimal step size in that direction. Let $\nabla g_K(x)$ denote the vector of the partial derivatives (gradient) of $g_K$ evaluated at x $\in g_K$. A direction in $g_K$ is any real vector, $d=(d_1, \ldots, d_K, d_{K+1})$. Given a feasible point, $x=(P, \xi)$ in the feasible space, $G_K$, a direction, d, is feasible, if $x+\lambda d \in g_K$, for some $\lambda > 0$. A feasible direction, d, is an improving feasible direction, if in addition, $\nabla g_K(x) \cdot d^t < 0$, t being the transpose operator. The process is described in Lemma 10.1.2 in the book by M. S. Bazaraa et al entitled "Nonlinear Programming," John Wiley & Sons, Inc. 1993. Thus, the optimal feasible direction, d*, is a solution of the following linear optimal feasible direction subproblem (for given x $\in g_K$):

Minimize $\nabla g_K(x) \cdot d^t$ over $d=(d_1, \ldots, d_K, d_{K+1})$ (20)

subject to d is a feasible direction and $-1 \leq d_j \leq 1$, $1 \leq j \leq K+1$ (normalization).

Once the optimal feasible direction, d*, is found, then $\lambda_{max}(x) = \max\{x+\lambda d^* \in g_K\}$ is the maximal feasible step size, and one may proceed to solve for the optimal step size, $\lambda^*$, in the following optimal step size subproblem (for given x $\in g_K$ and d*): (Optimal Step Size)

Minimize $g_K(x+\lambda d^*)$ over $\lambda$ subject to $0 \leq \lambda \leq \lambda_{max}(x)$. (21)

Once the optimal value, $\lambda^*$, is found, replace x by $x+\lambda^* d^*$ and solve again for new optimal feasible direction and step size. The algorithm terminates when the optimal value of $\nabla g_K(x) \, d^t$ in equation (20) falls below a prescribed threshold. Clearly, it is essential to find efficient solutions for equation (20) and equation (21), since these are solved repeatedly.

Suppose for now that equation (20) in the optimal feasible direction subproblem been solved, and consider equation (21) in the optimal step size subproblem. Since this line search is conducted on the finite interval $(0, \lambda_{max}(x))$, it is possible, in principle, to find the global minimum on the line segment, with arbitrary precision. However, prescribing a high precision, can render the solution overly time consuming. Note also that the optimal feasible direction in equation (20) is not exact, being based on a linear approximation of the objective function, using its first partial derivatives only. In the theory of nonlinear programming, this is known as the zigzagging effect. Therefore, there is no reason to invest heavily in a precise solution of equation (21). One widely-accepted practical solution to this problem is the so-called Armijo's Rule which may be described briefly as follows. Suppose that the line search is at point x, and that d is an improving feasible direction. Let $\theta(\lambda) = g_K(x + \lambda d)$, $0 \leq \lambda \leq \lambda_{max}$, and let $0 < \epsilon < 1$ and $\alpha > 1$ be two parameters (our implementation used $\alpha = 2$, $\epsilon = 0.2$). Define further, $\hat{\theta}(\lambda) = \theta(0) + \lambda \epsilon \theta'(0)$, where prime indicated the derivative. Armijo's Rule initially sets $\lambda = \lambda_{max}$; then, while $\theta(\lambda) > \hat{\theta}(\lambda)$, set $\lambda = \lambda/\alpha$ and repeat, and otherwise, set $\lambda^* = \lambda$ and exit.

Returning to the solution of equation (20), observe that a closed form solution can be obtained, owing to the relatively simple linear constraints involved. Since $P_K = 1 - \sum_{n=1}^{K-1} P_n$, a reduction in the problem dimension may be attained as follows. First, replace the original parameter space, $g_K$, by the reduced parameter space, $$H_{K-1} = \left\{ (P_1, \ldots, P_{K-1}, \xi) : P_n \geq 0, \right.$$
$$\left. 1 \leq n \leq K-1, \sum_{n=1}^{K-1} P_n \leq 1, \xi \in [0,1] \right\},$$

and second, replace the original objective function $g_K$, by a new objective function $h_{K-1}$, over $H_{K-1}$, given by $$h_{K-1}(P_1, \ldots, P_{K-1}, \xi) = \quad (22)$$
$$g_K\left( P_1, \ldots, P_{K-1}, 1 - \sum_{j=1}^{K-1} P_j, \xi \right), \quad (P_1, \ldots, P_{K-1}, \xi) \in H_{K-1}.$$

Consider a new optimization problem equation (20), with $g_K$ replaced by $H_{K-1}$, $g_K$ replaced by $h_{K-1}$, and direction vectors of the form $d = (d_1, \ldots, d_K)$. Assuming that the normalization constraints (but not the feasibility constraints) in equation (20) are satisfied for the new problem, it is clear that the minimum of $\nabla h_{K-1}(y) d^t$ is attained for $$d_j = -\text{sign}\left( \frac{\partial h_{K-1}(y)}{\partial y_j} \right), \quad 1 \leq j \leq K, \quad (23)$$

where sign(z) is +1 or −1 according as z is non-negative or negative, respectively. The goal is to change $d_j$ in such a way that the feasibility constraints in equation (20) are satisfied, while the objective function, $\nabla h_{K-1}(y) \, d^t$, is increased as little as possible. To this end, first fix the coordinate boundary constraints; for example, if $P_n = 0$ and $d_n = -1$, then set $d_n = 0$. Similar action is taken for other boundary values, e.g., if $P_n = 1$, and $\xi = 0$ or $\xi = 1$. Finally, the only constraint left is $\sum_{n=1}^{K-1} P_n \leq 1$. An infeasible direction will ensue, provided $\sum_{n=1}^{K-1} P_n = 1$ and $\sum_{j=1}^{K-1} d_j > 0$. The best feasible $d_j$ are obtained when their sum vanishes, coupled with a minimal increase of $\nabla h_{K-1}(y) d^t$. Let $$I_{K-1}(d) = \{ 1 \leq j \leq K-1 : d_j = 1 \text{ or } (d_j = 0 \text{ and } P_j = 1) \}$$

be the set of indices j, for which $d_j$ can be decreased without violating the normalization constraint in equation (20). It is readily seen that $\nabla h_{K-1}(y) d^t$ would increase the least by decreasing that $d_n$, such that $-\partial h_{K-1}(y)/\partial P_n$ is minimized over $I_{K-1}(d)$. For such an index n, decrease $d_n$ just enough to obtain $\sum_{j=1}^{K-1} d_j = 0$; if this is not possible, set $d_n = -1$, remove n from $I_{K-1}(d)$ and repeat. The optimal direction is obtained when the corresponding sum of $d_j$ vanishes. Pseudo-code for this optimal feasible direction algorithm appears in FIG. 1.

Having described in detail the derivation and theory of the algorithm TES modeling methodology, the algorithm's efficiency will be shown by way of three examples: two from the domain of compressed video traffic, and one from a laboratory experiment on an $NH_3$ laser intensity. All examples utilize K=100, $N_P$=4, $N_\xi$=11, and B=150, resulting in a total of $3.89 \times 10^6$ searches in the global search algorithm.

Data compression is extensively used to reduce the transmission bandwidth requirements of telecommunications traffic. The idea is to code the data at the source, thereby compressing it to a fraction of its original size, and then transport the compressed data over the network and decode it at its destination. Video service in emerging ISDN (Integrated Service Digital Networks) is a typical application, for which the exact reproduction of the original signal is not necessary. In fact, redundant visual information, to which the human eye is relatively insensitive, may be removed without degrading the perceptual quality of the decoded image. H.261 is a popular coding standard, which makes use of DCT (Discrete Cosine Transform) and other techniques to compress video spatial units (frames or subframes). Since such coded units have random (but highly autocorrelated) transmission requirements (say, in bits), the corresponding coding schemes are referred to as VBR (Variable Bit Rate).

FIG. 2 shows a TEStool screen showing the results of the algorithmic TES modeling of an empirical sample path of VBR video (frame sizes), in which the coding scheme used was a variant of the H.261 standard. The video scene content was a football sequence and the depicted results are for a TES+ model. Note the excellent agreement of the TES model histogram and autocorrelation function with their empirical counterparts in the upper-right and lower-left portion of FIG. 2, respectively. Furthermore, the corresponding sample paths in the upper-left portion of FIG. 2 bear are markedly "similar". The OSLO-obtained innovation density is depicted in the lower-right portion of FIG. 2.

MPEG (Moving Picture Expert Group) is an emerging family of compression standards designed to encode audio-visual signals over broadband transmission channels. The importance of MPEG derives from its planned central role in facilitating future delivery of multi-media services to customer premises. The following description focuses on MPEG-based video, designed to compress a full-motion video stream to about 1.5 Mbits/second.

Figure 3:
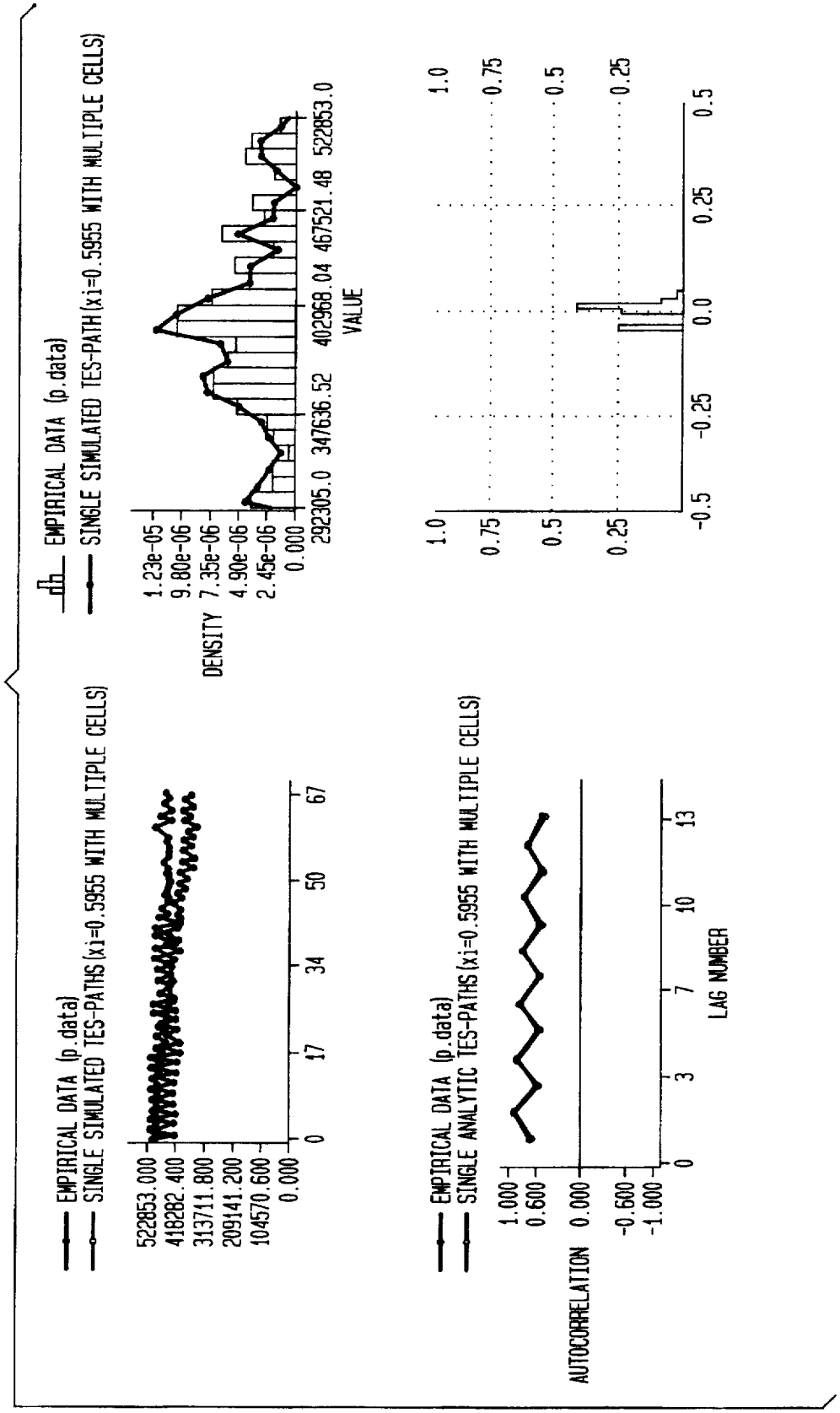
FIG. 3 shows a TEStool screen showing the algorithm TES modeling results for a P-frame model.

Coded picture sequences in MPEG are composed of cycles. A coded picture can be either an Intrapicture (I-frame), Predicted picture (P-frame) or Bidirectionally Predicted picture (B-frame). The sequence of picture (frame) types within each cycle is deterministic, though the corresponding bit rates are random. MPEG type sequences can be chosen as an MPEG parameter, depending on the application. The probability laws of frame types are markedly different. In particular, the marginal distributions of I-frames, P-frames, and B-frames are well separated, with descending means in this order. Consequently, MPEG-compressed sequences are non-stationary, due to the determinism of the frame type sequence. The particular type sequence chosen in the case study described here had a length-nine cycle of the form IBBPBBPBB . . . . The modeling approach called for a composite TES model. First, each subsequence of MPEG frame types was modeled as a separate TES sequence. I-frames and B-frames each by a $TES^+$ model and P-frames by a $TES^-$ model. FIG. 3 depicts a TEStool screen showing the algorithmic modeling results for the P-frame subsequence. The video scene content was a "busy" sequence of a toy train in motion, combined with a moving calendar. The figure is similar in structure to the previous one, and the model statistics are again in excellent agreement with their empirical counterparts.

Figure 4:
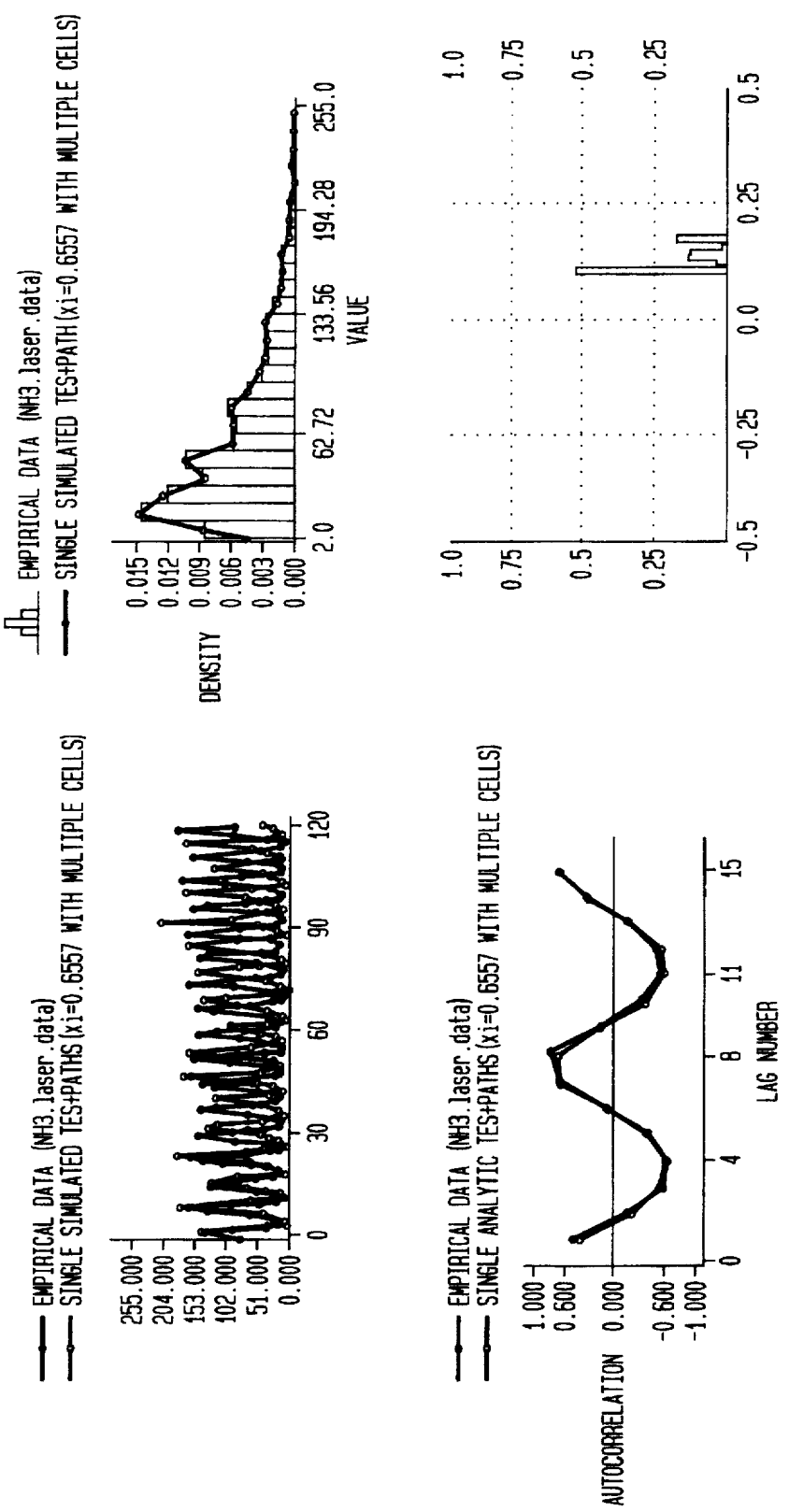
FIG. 4 shows a TEStool screen showing the algorithm TES modeling results for the fluctuation intensity of an $NH_3$ laser experiment.

The Santa Fe Institute conducts competitions in time series prediction, using neural net methods. An empirical set of partial random data is made available and competitors are asked to predict the rest of the time series. The data set in this example consisted of 1000 data points, representing a clean physics laboratory of the fluctuating intensity of an $NH_3$ laser experiment, reposited in ftp.santafe.edu. The GSLO algorithm assumed a maximal autocorrelation lag of T=15. The results are displayed in the TEStool screen of FIG. 4. Again, the figure is similar in structure to the previous ones, and the model statistics are in excellent agreement with their empirical counterparts. Furthermore, the model exhibits considerable predictive power in the sense that in the time interval (0, 30), the sample path of the model is very close to its empirical counterpart.

While there has been described and illustrated an algorithmic modeling of TES processes and its application to several specific examples, it will be apparent to those skilled in the art that variations and modifications are possible without deviating from the broad principles and spirit of the present invention which shall be limited solely by the scope of the claims appended hereto.

What is claimed is:

1. A method of simulation analysis of a network comprising the steps of:

receiving data signals representative of time series phenomena;

performing a global search on said data signals to select initial points for local search, which points result in the smallest values of the objective function $g_K(P,\xi) = \sum_{\tau=1}^{T} \alpha_\tau |\rho_{P,\xi}(\tau) - \hat{\rho}_Y(\tau)|^2$, $(P, \xi) \in g_K$, where P are the discretized densities, $\xi$ are stitching parameters, $\alpha_\tau$ are weight coefficients, $\rho_{P,\xi}(\tau)$ is a TES model autocorrelation function, and $\hat{\rho}_Y(\tau)$ is an empirical autocorrelation function;

performing local optimization using each of the selected initial points as a starting point to find the point which results in the smallest local minimum of the objective function for providing a TES (Transform-Expand-Sample) model of said data signals; and using said TES model of said data signals as an input signal for simulation analysis of a network.

2. A method of simulation analysis as set forth in claim 1, wherein said local optimization comprises a steepest descent process.

3. A method of simulation analysis as set forth in claim 2, wherein said steepest descent processes comprises Zoutendijk's Feasible Direction Method.

4. A method of simulation analysis as set forth in claim 1, wherein said local optimization comprises an optimal feasible direction algorithm.

5. A method of simulation analysis as set forth in claim 4, wherein said local optimization further comprises an optimal step size algorithm.

6. A method of simulation analysis as set forth in claim 1, wherein said data signal comprises bit rates of compressed video.

7. A method of simulation analysis as set forth in claim 6, wherein said bit rates of compressed video is H.261-Compressed video.

8. A method of simulation analysis as set forth in claim 6, wherein said bit rates of compressed video is MPEG-Compressed variable bit rate video.

* * * * *